Aug. 19, 1952 W. McK. MARTIN 2,607,698
PRODUCT STERILIZING APPARATUS AND METHOD
Filed May 17, 1948 3 Sheets-Sheet 1
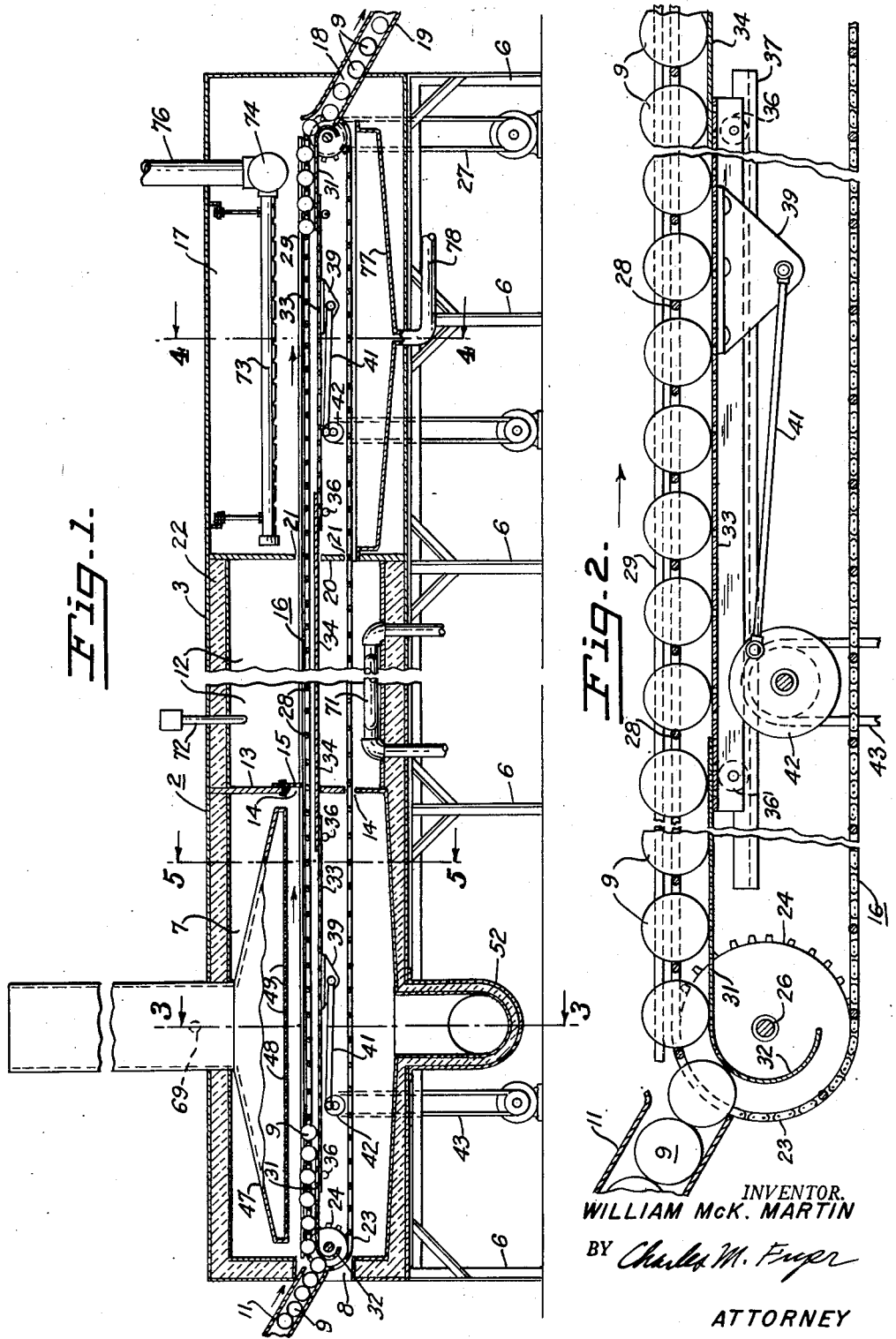
INVENTOR.
WILLIAM McK. MARTIN
BY Charles M. Fryer
ATTORNEY

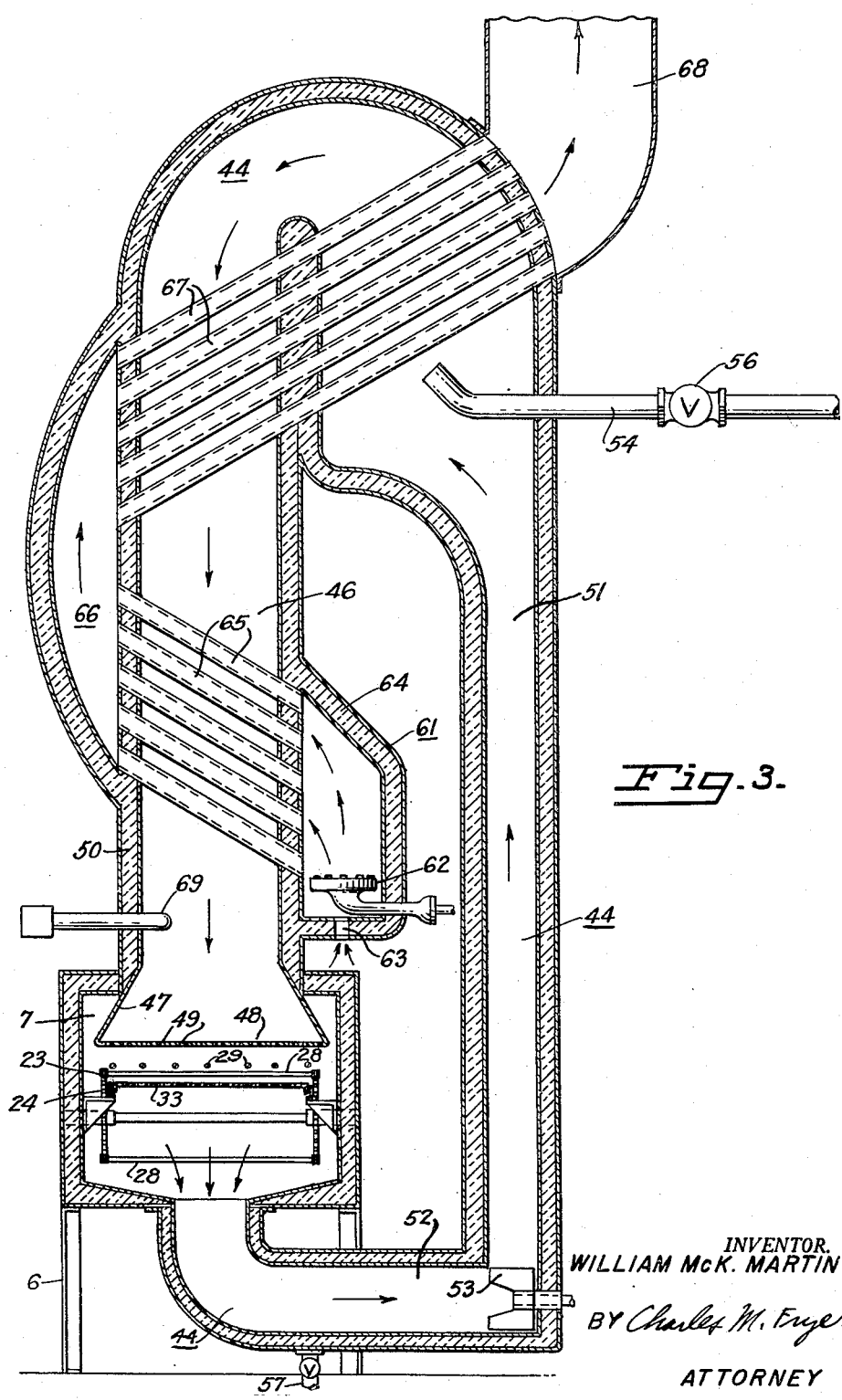

INVENTOR.
WILLIAM McK. MARTIN
BY Charles M. Fryer
ATTORNEY

Patented Aug. 19, 1952

2,607,698

UNITED STATES PATENT OFFICE 2,607,698

PRODUCT STERILIZING APPARATUS AND METHOD

William McK. Martin, San Mateo, Calif., assignor to James Dole Engineering Co., a corporation of Nevada Application May 17, 1948, Serial No. 27,523

9 Claims. (Cl. 99—214)

My invention relates to the sterilization of products, especially food products, and more particularly to an improved apparatus and method for sterilizing such products by cooking them in sealed containers in which the products have been previously packed.

In a popular type of commercial apparatus for the sterilization of food products, containers such as tin cans or glass in which the product is packed and which are subsequently sealed, are introduced into a so-called continuous type pressure cooker for effecting the sterilization. With most products, it is necessary to sterilize the same at a temperature above 212° F., the specific temperature and time required for steriliaztion being determined by the particular type of product being processed as is well known in the art. Steam is employed as a heating medium; and it is necessary to maintain the steam in the cooker above atmospheric pressure in order to obtain the required temperature about 212° F. Hence, in such continuous type cookers, special inlet and discharge valve means has to be employed with the cooker to permit the entrance and exit of the product filled containers, while at the same time maintaining the super-atmospheric pressure. This renders the apparatus more or less cumbersome and relatively expensive.

My invention is designed to obviate the necessity of special valve means in a continuous cooker of the type described, for maintaining the heating steam therein above atmospheric pressure. It has as its objects, among others, the provision of an improved apparatus and method for effecting sterilization of a product at substantially atmospheric pressure, thus eliminating the valve means previously pointed out; in which improved means is provided for effecting efficient agitation of the containers and their contents, so as to cause rapid and efficient heat penetration through the product to effect efficient sterilization; and which are relatively simple, inexpensive and easy to operate. Other objects of my invention will become apparent from a perusal of the following description thereof.

In general, I accomplish sterilization of the product at atmospheric pressure by introducing the sealed product filled containers into a sterilizing zone or chamber having valveless inlet and discharge openings, and into which steam is introduced for heating purposes. Outside heating means is applied to the steam to superheat the steam at a temperature above 212° F. at substantially atmospheric pressure, thus providing an adequate sterilizing temperature in the apparatus. Preferably, the sterilizing chamber is employed in conjunction with a temperature holding chamber in which the sterilizing temperature is maintained, and which communicates with a cooling chamber wherein the sterilized product is cooled according to well known practice.

In order to effect thorough penetration of heat through the product as it is conducted through the sterilizing chamber in the sealed containers, I employ improved container agitating mechanism in the sterilizing chamber, and also preferably in the cooling chamber to enhance cooling. Such agitating mechanism comprises broadly a supporting member for the containers along which the containers are moved in one general direction by suitable means while they are supported on their sides. As the containers are thus moved, the supporting member therefor is given a rapid back and forth reciprocating motion, and this imparts a rapid back and forth rolling motion to the containers, thus thoroughly agitating them and their contents. Although the agitating mechanism described is of particular applicability in my improved sterilizing apparatus and method, it may be used anywhere in product processing when it is desirable to agitate the contents in the containers.

Reference is now made to the drawings for a more detailed description of a preferred embodiment of my invention, in which:

Fig. 1 is a more or less schematic longitudinal section through the apparatus of my invention, with a portion broken away to shorten the view;

Fig. 2 is an enlarged fragmentary longitudinal section through the conveying and agitating mechanism; portions being broken away to shorten the view;

Fig. 3 is a fragmentary transverse vertical section taken in a plane indicated by line 3—3 in Fig. 1;

Figure 4:
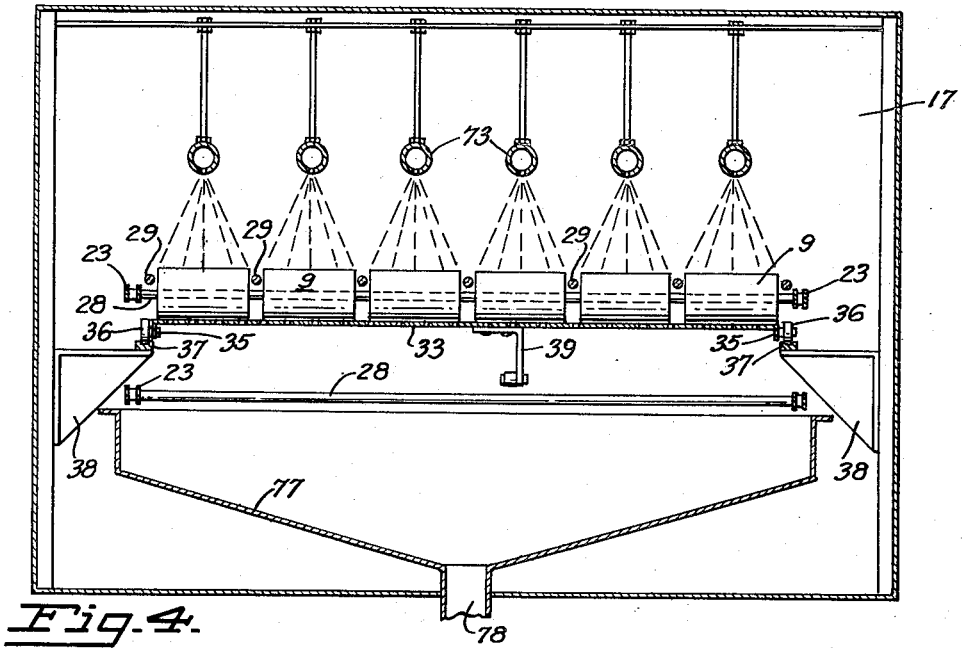
Fig. 4 is an enlarged fragmentary transverse vertical section taken in a plane indicated by line 4—4 in Fig. 1.

With reference to Fig. 1, the apparatus comprises elongated housing structure 2 of any suitable material such as metal 3 supported on suitable supporting standards 6. One end of the housing structure includes a sterilizing zone or chamber 7 having a valveless inlet opening 8 in its end for containers 9 which are introduced into the chamber by means of a conventional chute conveyor 11. Sterilizing chamber 7 communicates with an intermediate temperature holding zone or chamber 12 segregated from the sterilizing chamber by partition wall 13 having valveless openings 14 for passage of the reaches of an endless conveyor 16 to be subsequently described in greater detail. Preferably, opening 14 through which the upper reach of the conveyor passes is provided with a flexible closed flap 15 secured to partition wall 13 to permit passage of various size cans while at the same time preventing escape of excessive quantities of steam which is introduced into chamber 7.

At the end opposite to the sterilizing chamber end, housing structure 2 is provided with a cooling zone or chamber 17 having at its end a valveless discharge opening 18 from which the containers discharged from the apparatus are conducted by a conventional chute conveyor 19. Cooling chamber 17 is segregated from intermediate temperature holding chamber 12 by partition wall 20 having valveless openings 21 for passage of the conveyor reaches. Preferably, the insides of sterilizing chamber 7 and temperature holding chamber 12 are lined with suitable moisture resistant insulating material 22, such as corrosion-resistant sheet metal backed by glass wool or other suitable insulating material.

Figure 5:
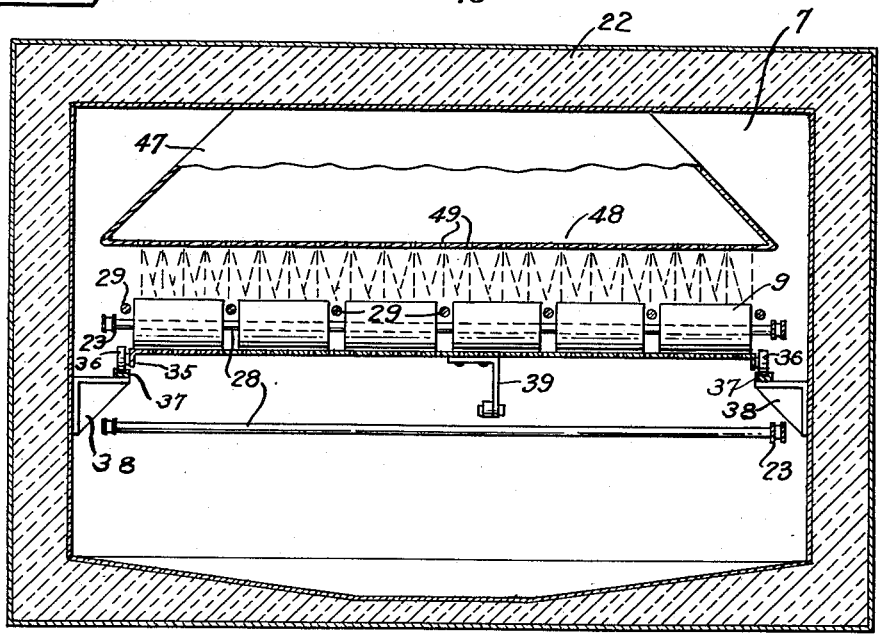
Fig. 5 is an enlarged fragmentary transverse vertical section taken in plane indicated by line 5—5 in Fig. 1.

Endless conveyor 16 extends all the way through housing structure 2 from the inlet end of sterilizing chamber 7 to the discharge end of cooling chamber 17, and comprises spaced endless chains 23 turning about sprockets 24 secured to shafts 26, one of which is driven by a sprocket chain drive 27 as is indicated in Fig. 1. Chains 23 are joined together by transversely extending bars 28 spaced apart a distance greater than the width of the largest containers adapted to be handled by the apparatus; and as can be seen more clearly from Figs. 4 and 5, longitudinally extending stationary guide bars 29 spaced apart a distance greater than the length of such largest containers, are provided to guide the containers in adjacent lines or rows through the apparatus as they are conducted in one general direction therethrough by the cross bars 28 of the endless conveyor. For supporting containers 9 as they are conducted by the endless conveyor, stationary supports 31 are provided at the turns of the conveyor; the supports having curved guide portions 32 adjacent the turns of the conveyor to direct the containers properly at the inlet and discharge ends of the apparatus from the inlet chute 11 and onto discharge chute 19, respectively.

In sterilizing chamber 7, containers 9 are supported on their sides on an apertured horizontally positioned flat or planar support member 33 underneath the portion of the conveying reach of the conveyor in the sterilizing chamber and which underlaps stationary support 31 at the inlet end of the sterilizing chamber, and also underlaps a stationary container support member 34 in temperature holding chamber 12. Support member 33 may be conveniently made of an apertured metal plate having side flanges 35, and is mounted for back and forth reciprocatable movement by means of side rollers 36 journalled on flanges 35 and adapted to ride on rails 37 supported by brackets 38 on the side walls of the sterilizing chamber.

Means is provided for imparting a rapid back and forth movement to support member 33 comprising bracket 39 secured to the underside of support member 33 and to which is pivotally connected a pitman rod 41 in turn pivotally connected to crank wheel 42 which is driven by any suitable drive mechanism 43. As the containers are conducted by the conveyor in one direction and on their sides along support member 33, it is seen that as the support member is reciprocated, a rapid back and forth rolling motion is imparted to the containers by the frictional engagement between the containers and the support member, causing the containers and their contents to be thoroughly agitated. This enhances thorough penetration of heat through the containers imparted by steam which is supplied to the sterilizing chamber in a manner to be subsequently explained.

In intermediate temperature holding chamber 12, the agitating mechanism, although it may be employed, is not required because the sterilizing temperature is merely held in this chamber. Conveyor 16 conducts the containers with unidirectional rotation through the temperature holding chamber 12 along stationary container support member 34. In the cooling chamber wherein the containers and their contents are cooled, preferably by water spraying, I preferably employ the described agitating mechanism therein to effect agitation of the containers and their contents, and thus enhance thorough cooling by the water spray. The construction of the agitating mechanism in such cooling chamber is the same as that in sterilizing chamber 7; and consequently the same general reference characters are applied to the main parts thereof.

Means is provided for effecting sterilization of the container contents in sterilizing chamber 7 as the containers are conducted therethrough. I utilize steam as the medium to heat the containers so as to sterilize their contents; and I apply outside heat to the steam to bring it to a desired sterilizing temperature above 212° F., the steam being thus superheated at substantially atmospheric pressure as the entire inside of my apparatus will be at substantially atmospheric pressure by virtue of the valveless openings to the outside atmosphere. Any suitable means may be employed to superheat the steam at atmospheric pressure, but I preferably utilize the arrangement illustrated which enables recirculation of the steam.

With particular reference to Fig. 3, it will be noted that sterilizing chamber 7 forms part of an endless passageway 44. This passageway comprises an upright portion 46 communicating with the top of the sterilizing chamber by means of a steam discharge hood 47 extending into the chamber and having a discharge end 48 above the portion of conveyor 16 in the sterilizing chamber. End 48 is provided with a multiplicity of steam discharge apertures 49 and it is substantially coextensive with the portion of the conveyor in the chamber, so as to distribute the steam uniformly over the containers as they are conducted through the chamber. The upper end of passage portion 46 communicates with another upright passage portion 51; and also forming part of endless passageway 44 is a bottom portion 52 communicating with the bottom of sterilizing chamber 7 and also with the bottom of passage portion 51. Preferably, the entire passageway 44 is lined with suitable moisture resistant insulating material 50, such as corrosion-resistant sheet metal backed with suitable insulation.

A fan 53 of any suitable construction is provided in passageway 44 to effect circulation of the steam, introduced through a steam inlet pipe 54, through the passageway and through the sterilizing chamber 7; a suitable valve 56 being provided in steam inlet pipe 54 to control the quantity of steam flow. Preferably, the bottom of sterilizing chamber 7 is sloped toward passage portion 52 so that any steam condensate collecting in the sterilizing chamber may escape into passage portion 52 from which it may be drained, when the apparatus is shut down, through valve 57. From the preceding, it is seen that steam introduced into endless passageway 44 will be continuously circulated therethrough and through the sterilizing chamber, by fan 53, and that any steam escaping from the system can be made up by introduction of additional steam through steam inlet pipe 54. If desired, when the apparatus is in operation, the flow of steam from pipe 54 may be so controlled by setting of valve 56 as to replace continuously the quantity of steam which may condense on the containers or escape from the system.

Irrespective of the pressure of the steam discharge into the apparatus from steam inlet pipe 54, it will substantially immediately be at atmospheric pressure because, as previously related, one of the important objects of my invention is the elimination of valves in the apparatus which were, heretofore, deemed necessary for obtaining a proper sterilizing temperature above 212° F. by maintaining the steam at superatmospheric pressure. In my apparatus and method, I provide any suitable outside heating means for superheating the steam to a sterilizing temperature above 212° F. at substantially atmospheric pressure. Such means may be electrical or any other type of heating means, but I preferably employ gas. For this purpose, a side of portion 46 of passageway 44 is provided with a relatively small furnace 61 having a gas burner 62 therein, and an opening 63 for inlet of air to enable combustion of the gas flowing from burner 62.

Furnace 61 is lined with refractory insulating material 64; and a plurality of fire tubes 65 communicating with the furnace, extend across passage portion 46 and communicate with a manifold chamber 66 at the opposite side of passage portion 46. Another group of fire tubes 67 above fire tubes 65 communicates with manifold chamber 66 and extends across both passage portions 46 and 51; their outlet ends communicating with stack 68. By this arrangement, steam circulated in passageway 44 becomes heated to the desired sterilzing temperature by the hot gases of combustion flowing through the groups of fire tubes 65 and 67. The temperature to which the steam is superheated at atmospheric pressure, may be readily controlled by control of the flow of gas burned by burner 62; and if desired, such temperature may be automatically controlled through any automatic thermostat control mechanism 69 shown schematically in Fig. 3 and which may be connected to control the quantity of gas flow through burner 62 by any suitable automatic mechanism in a well known manner.

The conveyor is operated at such speed as to cause the contents in the containers to be heated to the proper sterilzing temperature as they are conducted through the sterilizing chamber 7. In this connection, the sterilizing chamber 7 may be made long enough so that the product will be in it for sufficient length of time, depending upon the particular product and the rate of movement of the conveyor, to become completely sterilized. However, to shorten the length of the sterilizing chamber, I preferably employ temperature holding chamber 12 in conjunction therewith, but this chamber may be omitted if the sterilizing chamber is made long enough.

Such temperature holding chamber 12 is provided with a suitable heater 71 which may be in the form of a steam radiator as shown, or a gas burner or any other suitable heating means, which is maintained at the proper temperature for holding the temperature holding chamber at a sterilizing temperature so that the product will be maintained at such sterilizing temperature for a sufficient length of time depending upon the rate of speed of the product through the chamber. Preferably, I employ in the temperature holding chamber a thermostat control 72 which may be of any suitable construction to control automatically the heating of heating means 71.

It is customary after the product has been sterilized in sealed containers, to cool the same; and for this purpose the cooling chamber 17 is provided. The cooling is preferably effected by water spray emitted from a plurality of apertured water pipes 73 above the conveyor and which are connected to manifold pipe 74 in turn connected to water inlet pipe 76. Thus, as the containers are conveyed to the cooling chamber they are efficiently cooled by the multiplicity of water sprays emitted from the apertured water spray pipes 73; and the cooling is enhanced by the agitation imparted to the containers and their contents as they are conducted through the cooling chamber in the manner previously described. Cooling may be further enhanced, if so desired, by drawing or forcing a current of air through the cooling chamber, by any suitable fan arrangement (not shown), such air current exerting a cooling effect by vaporization of water from the hot containers. Drain pan 77 is provided at the bottom of the cooling chamber to collect the sprayed water which is discharged through outlet 78.

From the preceding, it is seen that I have provided a comparatively simple apparatus and method for efficaciously sterilizing the product in sealed containers and in which no valves are utilized at the inlet and discharge openings of the apparatus, thus simplifying the apparatus; steam being employed as the heating medium and the steam being superheated to a sterilizing temperature above 212° F. at atmospheric pressure. My improved agitating mechanism cooperates with the method of heating the containers and their contents because of the efficient agitation which is imparted to the containers as they are conducted along their sides by the endless conveyor, while a simultaneous rapid back and forth rolling movement is imparted to the containers. Although so-called tin can containers are schematically illustrated in the drawings, my apparatus and method will handle any other types of containers such as glass.

I claim:

1. Apparatus for sterilizing a product in containers comprising a sterilizing chamber, an endless passageway of which the chamber forms a part, means for introducing steam into said passageway, means for effecting circulation of said steam in the passageway and through the chamber for applying heat to the containers to sterilize the product therein, means for superheating the steam to a sterilizing temperature as it is circulated through the passageway, means for conducting the containers through the chamber, and means for simultaneously agitating the containers as they are conducted through the chamber.

2. Apparatus for sterilizing a product in containers comprising a sterilizing chamber having a valveless inlet opening for introduction of the containers into the chamber whereby the inside of the chamber will be at substantially atmospheric pressure, a cooling chamber in which the containers are subsequently cooled and which is in valveless communication with said sterilizing chamber, means including an endless conveyor for conducting the containers, means cooperating with the portion of the conveyor in said sterilizing chamber to impart a back and forth rolling motion to said containers as they are conducted by the conveyor for agitating the containers and their contents, means for introducing steam into the sterilizing chamber for applying heat to the containers to sterilize the product therein, and means for superheating the steam to a sterilizing temperature at substantially atmospheric pressure.

3. Apparatus for sterilizing a product in containers comprising a sterilizing chamber having a valveless inlet opening in one end for introduction of the containers into the chamber whereby the inside of the chamber will be at substantially atmospheric pressure, a temperature holding chamber in valveless communication with the opposite end of said sterilizing chamber, a cooling chamber in valveless communication at one end with said temperature holding chamber and having a valveless discharge opening in its opposite end for discharge of the containers, means including an endless conveyor in said chamber for conducting the containers, a reciprocatable container support member cooperating with the portion of the conducting reach of said endless conveyor in each of said sterilizing and cooling chambers to impart a rapid back and forth rolling motion to said containers as they are conducted by the conveyor for agitating the containers and their contents, means for cooling the containers in the cooling chamber, means for heating the temperature holding chamber, means for introducing steam into the sterilizing chamber for applying heat to the containers to sterilize the product therein, including a hood above the portion of the conveyor in the sterilizing chamber and having an apertured discharge end substantially coextensive with said conveyor portion to distribute the steam uniformly over said containers, and means for superheating the steam to a sterilizing temperature at substantially atmospheric pressure.

4. Apparatus for sterilizing a product in containers comprising a sterilizing chamber, an endless passageway of which the chamber forms a part, means for introducing steam into said passageway, a fan in said passageway for effecting circulation of said steam in the passageway and through the chamber for applying heat to the containers to sterilize the product therein, means including an endless conveyor for conducting the containers through the chamber, said passageway including a steam discharge hood adjacent said conveyor and having an apertured discharge end substantially coextensive with the portion of the conveyor in said chamber to distribute the steam uniformly over said containers, and means for superheating the steam to a sterilizing temperature as it is circulated through the passageway.

5. A method of sterilizing a product in containers which comprises continuously conducting a line of containers lying on their sides through a sterilizing zone at substantially atmospheric pressure, introducing steam into said zone for applying heat to the containers to sterilize the product, while the containers are conducted through the zone imparting to them a rapid back and forth rolling motion to agitate the containers and their contents and thereby enhance heat penetration, and superheating the steam to a sterilizing temperature at substantially atmospheric pressure.

6. In the processing of a product in containers, the method of agitating the containers and their contents which comprises supporting the containers on their sides, while they are thus supported moving said containers in one general direction with an uninterrupted motion and with unidirectional rotation, and smultaneously imparting to the support a back and forth reciprocating motion to roll the containers back and forth.

7. In product processing apparatus wherein the product is in a sealed container, mechanism for agitating the product filled container to agitate the product therein, comprising a plate frictionally engaging and supporting the product filled container on its side, an endless conveyor having one of its reaches positioned above said plate, means continuously moving said conveyor whereby said reach is moved continuously in one general direction, said conveyor reach having a cross bar engaging the product filled container and moving it on its side in said one general direction while said product filled container is supported on said plate, and mechanism connected to said plate reciprocating said plate back and forth in the direction of movement of said reach and in an opposite direction as the product filled container is moved therealong by said conveyor to impart to the product filled container a back and forth rolling motion to thus agitate the container and the product therein.

8. Apparatus for sterilizing a product in sealed containers comprising a sterilizing chamber having valveless container inlet and outlet openings whereby the inside of the chamber will be at substantially atmospheric pressure, conveyor means within said chamber continuously conducting a line of the product filled containers from the inlet opening through the chamber and out through the outlet opening, means within said chamber simultaneously agitating the containers and the product therein as they are conducted through the chamber, means connected to said chamber introducing steam into the chamber for applying heat to the containers to sterilize the product therein, and heating mechanism associated with said steam introducing means applying external heat to the steam to superheat the steam to a sterilizing temperature above 212° F. at said atmospheric pressure.

9. A method of sterilizing a product in sealed containers which comprises providing an enclosed zone having unsealed inlet and outlet openings whereby said zone is unsealed to the atmosphere and the interior of said zone will be at substantially atmospheric pressure, continuously conducting a line of the product filled containers from the inlet opening through said zone and out through the outlet opening, while said product filled containers are conducted through said zone simultaneously agitating the containers and the product therein, introducing steam into said zone to apply heat to the containers and sterilize the product therein, and applying external heat to said steam introduced into said zone to superheat the steam to a sterilizing temperature above 212° F. at said atmospheric pressure.

WILLIAM McK. MARTIN.

REFERENCES CITED

The following references are of record in the file of this patent:

UNITED STATES PATENTS

| Number | Name | Date |
|---|---|---|
| 274,595 | Hayden | Mar. 27, 1883 |
| 876,534 | Farnum et al. | Jan. 14, 1908 |
| 1,270,798 | Dunkley | July 2, 1918 |
| 1,481,883 | Badenhauser | Jan. 29, 1924 |
| 1,491,093 | Fooks | Apr. 22, 1924 |
| 1,570,235 | Foods | Jan. 19, 1926 |
| 1,591,645 | Rafu | July 6, 1926 |
| 2,144,334 | Kennedy | Jan. 17, 1939 |
| 2,295,846 | Horner | Sept. 15, 1942 |
| 2,347,495 | Mitton | Apr. 25, 1944 |
| 2,415,782 | Zademach | Feb. 11, 1947 |

FOREIGN PATENTS

| Number | Country | Date |
|---|---|---|
| 52,554 | Denmark | Jan. 11, 1937 |